United States Patent [19]

Cheng

[11] Patent Number: 5,098,267
[45] Date of Patent: Mar. 24, 1992

[54] APPARATUS AND METHOD FOR PRODUCING AND MOLDING STRUCTURAL FOAM

[75] Inventor: Alan T. Cheng, Livingston, N.J.

[73] Assignee: Union Carbide Industrial Gases Technology Corporation, Danbury, Conn.

[21] Appl. No.: 542,062

[22] Filed: Jun. 22, 1990

[51] Int. Cl.⁵ .............................................. B29C 45/50
[52] U.S. Cl. .................................... 425/4 R; 264/50; 366/76; 366/81; 366/157; 425/559; 425/587; 425/205; 425/208; 425/817 R
[58] Field of Search ............... 264/46.1, 50, DIG. 83; 425/4 C, 4 R, 817 R, 817 C, 557, 561, 559, 587, 205, 208; 366/76, 81, 157

[56] References Cited

U.S. PATENT DOCUMENTS

| | | | |
|---|---|---|---|
| 3,687,582 | 8/1972 | Hendry et al. | 264/DIG. 83 |
| 3,728,053 | 4/1973 | Stillhard et al. | 425/4 R |
| 3,856,442 | 12/1974 | Gallagher et al. | 425/4 C |
| 3,937,447 | 2/1976 | Eckardt et al. | 264/DIG. 83 |
| 3,941,529 | 3/1976 | Klingebiel | 425/4 R |
| 4,067,673 | 1/1978 | Hendry | 425/4 R |
| 4,169,679 | 10/1979 | Miller et al. | 366/76 |
| 4,211,523 | 7/1980 | Hunerberg | 425/4 C |
| 4,302,409 | 11/1981 | Miller et al. | 425/4 C |
| 4,548,776 | 10/1985 | Holdredge, Jr. | 264/50 |

OTHER PUBLICATIONS

"Thermoplastic Structural Foam Molding" by R. J. LaBelle, Modern Plastics Encyclopedia, Oct. 1987, vol. 64, No. 10A, pp. 242-246.

*Primary Examiner*—Jeffery Thurlow
*Attorney, Agent, or Firm*—Peter Kent

[57] ABSTRACT

A single-state apparatus for injection molding structural foam articles has a resin plasticating barrel in which a cylindrical plunger reciprocates and rotates. The plunger has a screw section for plasticating resin and advancing the plasticate into a metering section with grooves in which plasticate flows. The grooves are contiguous to a fluid foaming agent inlet in the side of the barrel so that they alternately open and close the inlet to introduce fluid foaming agent periodically into the plasticate. Downstream, the plunger has channels for mixing and advancing plasticate to the forward end of the plunger where it accumulates and is periodically rammed by the plunger into the mold.

19 Claims, 3 Drawing Sheets

APPARATUS AND METHOD FOR PRODUCING AND MOLDING STRUCTURAL FOAM

The present invention relates generally to an apparatus and method for producing and molding foamed structural plastic material and more particularly to an apparatus and method for injection molding thermoplastic structural foam articles.

A structural foam article refers to a plastic body having a solid skin integral with a foamed or cellular interior providing a structure capable of carrying the stress intended for the article. One method of producing plastic foam is to plasticate resin and mix in a solid or liquid additive which will chemically release a gas, usually as a function of its temperature and pressure. Another method is to inject and distribute into plasticated resin a gas or volatile fluid. The plasticated resin, or plasticate as it is called, with the foaming agent distributed in it, is then forced into a mold where it is depressurized. The depressurization allows the distributed gas to expand, or the foaming agent to gasify, thereby creating a foam which expands to fill the mold. The amount of expansion is determined by the type and amount of foaming agent present and by the depressurization ratio.

In the short-shot or low-pressure technique of molding, the mold is only partially filled with resin. The mold walls are relied on to rupture the foam cells which contact the mold walls as the melt enters, and to inhibit expansion of the cells at the wall, thereby allowing the article to form with a solid skin. The surface, however, is characterized by a pattern produced by the foaming agent.

Other techniques are practiced to reduce the surface pattern produced by the foaming agent. The expandable mold or high pressure technique produces a surface quality equal to solid injection molding. In this technique, the mold cavity is fully charged with plasticate thereby developing a relatively high pressure in the cavity. Expansion to permit foaming is then accomplished by withdrawing a centrally located removable insert from the mold.

A variety of resins, including thermoplastic and thermosetting, have been used for structural foam. The resin is selected primarily for its structural or physical properties, but also on cost, appearance, flow characteristics, flame retardancy and other considerations. Popular materials are styrenics, olefins, modified polyphenylene ether and polycarbonate.

Machines built for injection molding of structural foam articles are similar to solid plastic injection molding machines. Machines for molding large articles usually employ two stages or cylinders. A screw constantly rotating in a heated first cylinder receives granular resin from a hopper, plasticates the resin, mixes in a foaming agent, and conveys the mixture to an accumulator cylinder which is periodically emptied by a piston into a mold.

Machines for molding small articles usually employ a rotating, reciprocating screw in a single cylinder. The screw plasticates the resin, mixes in a foaming agent, accumulates the resin charge in front of it while moving rearward, and, when the gate to the mold opens, moves forward ramming the charge into the mold.

Nitrogen gas is commonly used as a foaming agent because of its inertness and low cost. As might be expected, introducing and dispersing the gas uniformly in the plasticated resin is important in achieving a uniform cellular core in a structural foam article. Typically the gas is injected as minute bubbles into the surface of the plasticate while advancing and mixing within the screw. Depending on material characteristics, some of the gas may dissolve into the plasticate while the rest remains as bubbles. Gas bubbles, almost as soon as formed in the plasticate, tend to coalesce into nonuniform sizes and distributions which degrade the foamed product. The single stage or reciprocating screw molding machine avoids conveying gas-charged plasticate to an accumulator thereby reducing the opportunity for gas bubble coalescence.

Various mechanisms have been devised to introduce and distribute gas into plasticate and to maintain the distribution as the plasticate enters the mold. One such mechanism used in the continuous extrusion of gas-blown cellular thermoplastic material is described by Miller et al in U.S. Pat. No. 4,169,679. Downstream of a plasticating screw rotating within a barrel, gas is introduced into the plasticate by a distributing and mixing head. However, the described head will not uniformly distribute gas into plasticate during cyclical operation inherent in injection molding.

U.S. Pat. No. 4,548,776 to E. C. Holdridge, Jr. describes another mechanism used in the injection molding of structural foam articles. A valve-like mixing assembly periodically accepts plasticated resin from an accumulator. In the mixing assembly, foaming agent, in the form of gas or volatile fluid, is introduced into the plasticate, which then enters an annular chamber in the assembly. There the plasticate encounters, flows through, and drives turbine blades mounted on a rotable spool. The plasticate next flows through another stage of blades on the spool which mix the plasticate enroute to the mold. This mixing assembly is intricate, costly to fabricate and costly to accommodate in an existing molding machine. In addition, no provision exists for introducing the gas in minute increments to the plasticate.

An object of this invention is to provide an improved apparatus for the injection molding of structural foam articles using a gaseous or volatile fluid as foaming agent. Another object is to provide an injection molding apparatus having a mechanism for injecting gas in minute, discrete quantities into plasticated resin.

A feature of this invention is that the apparatus can be provided readily by modification of some existing types of machines for molding solid plastic articles, namely those machines which utilize a rotating, reciprocating plunger in a single cylinder.

An advantage of this invention is that light-weight, structural foam articles having large wall thicknesses can be injection molded with relatively uniform cell size and distribution and with a surface devoid of defects. Another advantage is that such articles can be injection molded rapidly and economically.

Other objects, features and advantages and a fuller understanding of the present invention will become more fully apparent from the description of the preferred embodiments to follow and the appended claims taken in conjunction with the accompanying drawings.

SUMMARY OF THE INVENTION

In an injection molding machine embodying the invention, the resin plasticating barrel is fitted with a tap on its side for admitting fluid foaming agent. A cylindrical plunger is mounted at one end for reciprocation and continuous rotation within the barrel. An upstream section of the plunger has a screw flight which accepts, compresses, mulls and plasticates resin granules, and forces the plasticate to flow downstream. Next, in a metering section, the plasticate flows in grooves in the cylindrical surface of the plunger. The grooves reciprocate and rotate contiguous to the foaming agent inlet in the barrel so that the inlet is alternately opened and closed by the grooves and the lands between the grooves. Flowing under its own pressure, fluid foaming agent, in minute, discrete quantities is periodically introduced from the inlet into the plasticate in the metering-section grooves.

The plasticate next enters a mixing section, into generally longitudinal grooves which terminate at the end of the section. The leading edges of the grooves (relative to rotation) have a low land and the trailing edges have a high land. Thus the plasticate flows through the clearance between the low lands and the barrel and then into radial slots in the plunger which lead to a central bore. In flowing through the clearance, the plasticate is smeared out into a thin layer, and upon entering the radial slots is recompacted. These actions intensively mix the plasticate and further distribute the foaming agent throughout the plasticate.

The central bore leads into a valve chamber which houses a check valve element. The chamber discharges into passages leading to the forward end of the plunger. Plasticate flows to the forward end of the plunger forcing the plunger to retreat as plasticate accumulates in front of the plunger. Opening the gate to the mold causes the plunger to move forward and the check valve to close allowing the plunger to ram the accumulated charge into the mold. Closing the gate restarts the cycle with plasticate flowing forward and the plunger retreating as a new plasticate charge accumulates in front of the plunger.

DETAILED DESCRIPTION OF THE PREFERRED EMBODIMENT

Figure 1:
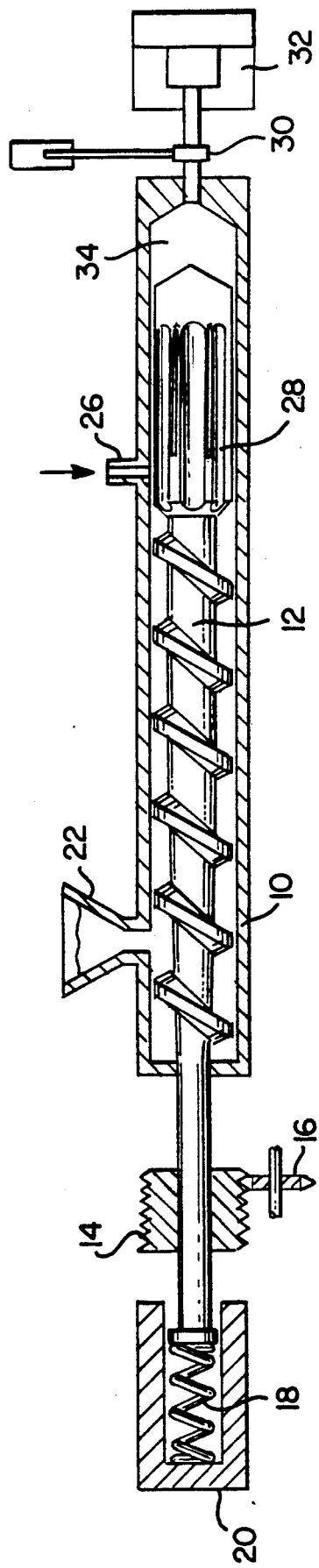
FIG. 1 is a diagrammatic representation of the extruder portion of a type of injection molding machine embodying the invention.

In the representation of an injection molding machine embodying the invention shown in FIG. 1, barrel 10 contains plunger 12 which is adapted for reciprocation and rotation. While various mechanisms may be employed to accomplish this motion, shown mounted on plunger 12 is spline 14 which is continuously rotated by engaging gear 16 which may be powered by an electrical or hydraulic motor (not shown). An end of plunger 12 butts against spring 18 contained in fixed housing 20. Alternatively, another mechanical or a fluid device may be used to exert a force on the end of plunger 12. Granules of thermoplastic resin feed into barrel 10 from hopper 22 and are engaged by screw section 24 of plunger 12. Screw section 24 mulls and heats the resin into a flowable plasticate and advances the plasticate into metering section 28.

Figure 2:
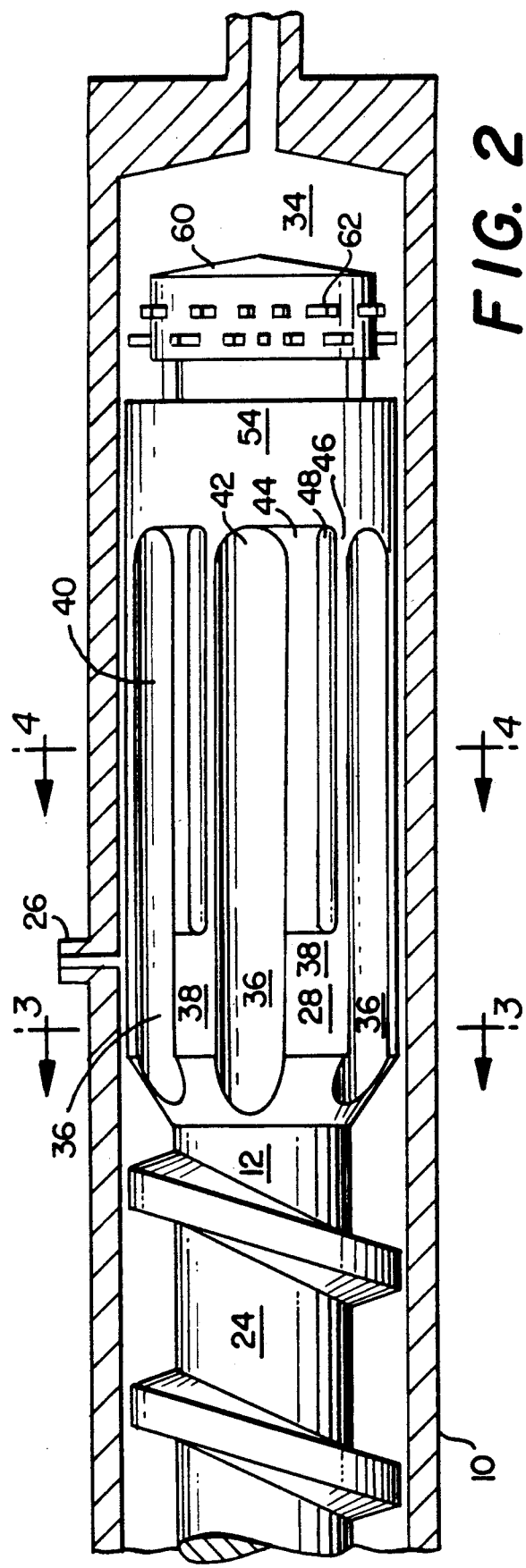
FIG. 2 is an expanded longitudinal view of the extruder embodying the invention with the barrel of the extruder in section.

The surface of plunger 12 in metering section 28 has grooves 36 through which the plasticate courses. Between the grooves are lands 38. As may be seen in greater detail in FIG. 2, mounted on barrel 10, is inlet 26 through which fluid foaming agent is supplied under pressure. Inlet 26 may comprise a nipple affixed onto barrel 10 over a hole which penetrates and is flush with the inner surface of barrel 10. The reciprocation of plunger 12 is limited so that grooves 36 are always contiguous to inlet 26. Hence the length of metering section 28 is at least equal to the length of reciprocation of plunger 12. Thus as plunger 12 rotates and reciprocates, foaming agent inlet 26 is alternately opened and closed by grooves 36 and lands 38 thereby metering discrete, minute quantities of foaming agent into the plasticate along the length of grooves 36.

The flow rate of fluid foaming agent may be conveniently metered upstream of inlet 26 by directing the fluid foaming agent through an orifice (not shown) at a sufficient controlled upstream pressure so that critical (sonic) flow occurs in the orifice when inlet 26 is open. Thereby the foaming agent flow will be independent of pressure fluctuations in barrel 10.

Figure 4:
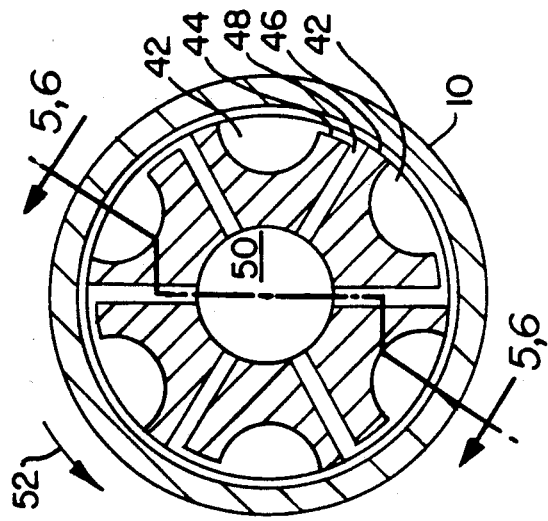
FIG. 4 is a section of FIG. 2 taken along line 4—4.
Figure 3:
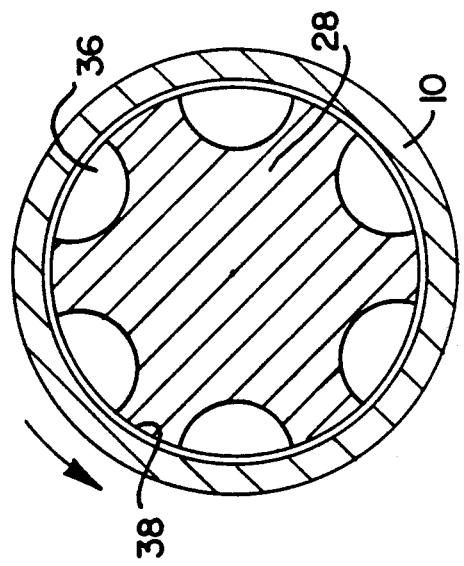
FIG. 3 is a section of FIG. 2 taken along line 3—3.

Downstream of metering section 28 is mixing section 40 where the surface of plunger 12 has mixing-section grooves 42. The upstream ends of mixing-section grooves 42 communicate with and receive plasticate from the downstream end of metering-section grooves 36. As best shown in FIG. 4, the surface between grooves 42 is divided into lands 44 and 46 by radial slots 48 which lead to a central bore 50. Lands 44 are on the trailing edges of grooves 42 with respect to the direction of rotation shown by arrow 52, and are recessed or low relative to the general surface of plunger 12. Lands 46 are on the leading edge of grooves 42, and are not recessed or are less recessed than lands 44, and thus are high relative to lands 44. Thus, plasticate with injected foaming agent flows from metering-section grooves 36 into mixing-section grooves 42, across low lands 44 through slots 48 and into bore 50 with considerable mixing. Intense mixing particularly occurs as plasticate is smeared out into a thin layer across low lands 44 and then recompacted to flow in slots 48.

Figure 5:
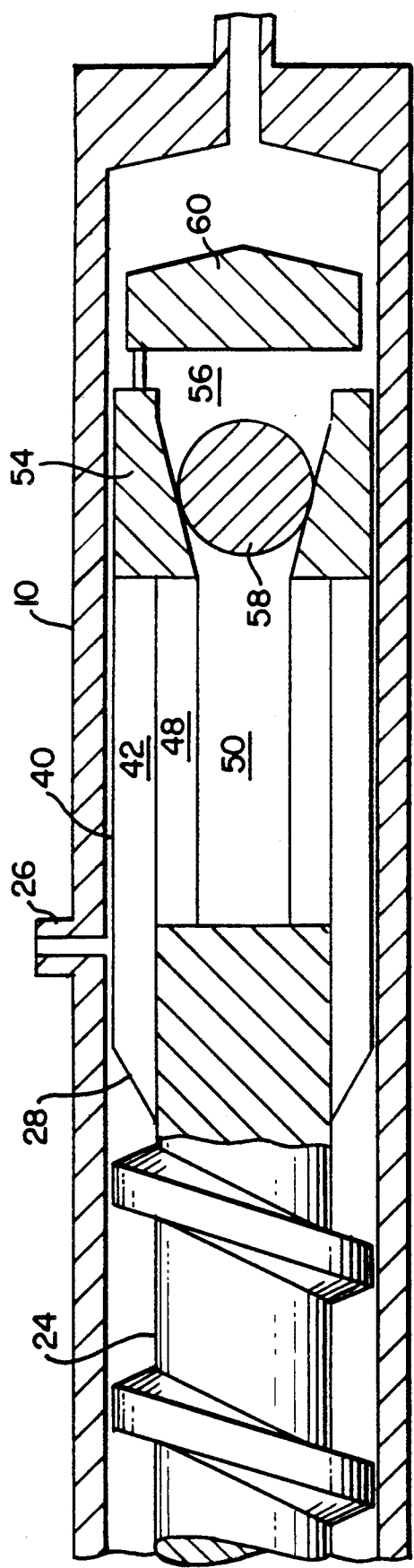
FIG. 5 is a longitudinal view of the extruder shown in FIG. 2 taken generally along the lines 5—5 of FIG. 4.

Downstream of mixing section 40, on plunger 12, is valve section 54 which contains a chamber 56 communicating with bore 50 and the surface of plunger 12. Chamber 56 contains a ball 58 which seats to prevent return flow of plasticate during the forward stroke of plunger 12 to fill mold 32. In FIG. 5 the plunger has just begun its forward stroke and the ball is in seated position. Other types of check valves may be substituted for the described ball valve.

Downstream of valve section 54, at the forward end of piston 12, is end section 60 which has a reduced radius allowing protrusions 62 to extend into the reduction. Plasticate flows radially outward from chamber 56 into and through the annulus created by the reduced radius in end section 60 where further mixing by protrusions 62 occurs.

During the time when gate 30, which leads to mold 32, is closed, the pressure developed by the plasticate on the outside surfaces of end section 60 produces a force which causes plunger 12 to move rearward (to the left in the figures) against the force exerted by spring 18. This movement creates a growing volume of plasticate in space 34 in front of plunger 12. When gate 30 opens, spring 18 urges plunger 12 forward ramming the volume of plasticate in space 34 into mold 32. The volume of plasticate accumulated in space 34 prior to opening of gate 30 relative to the volume of mold 32 is a significant factor in determining the expansion of the plasticate and the density of the final article.

Figure 6:
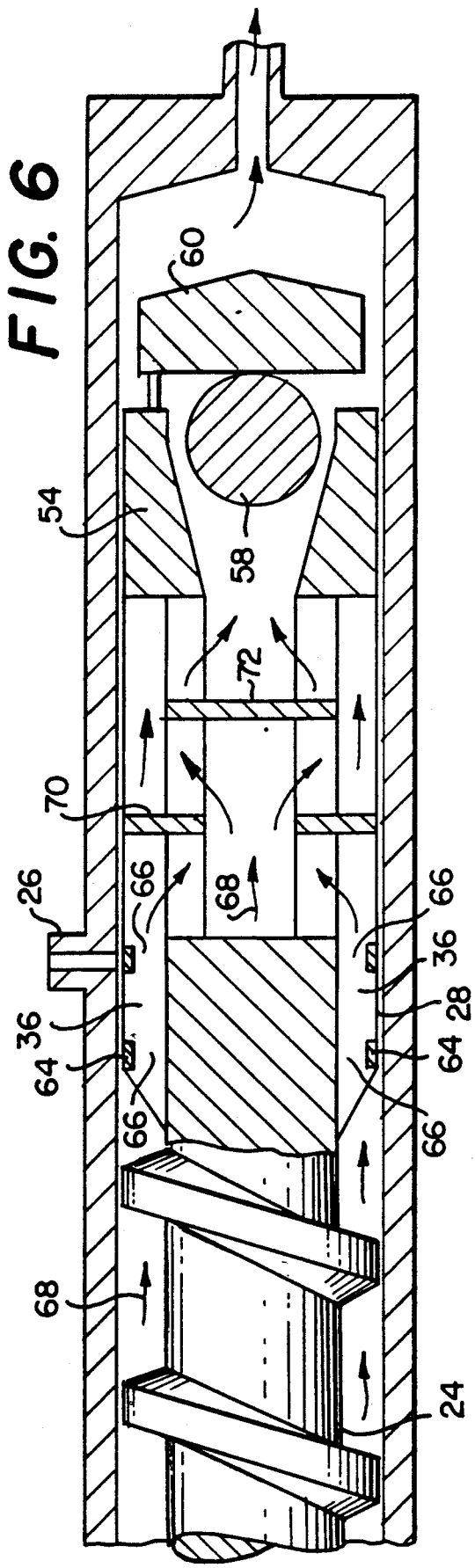
FIG. 6 is a cross-sectional view taken generally along lines 6—6 of FIG. 4 and depicting another embodiment of the invention.

The minute subdivision and metering of foaming agent into the plasticate and the subsequent intensive mixing of the plasticate which distributes the foaming agent are important achievements of the invention allowing the molding of articles with an interior containing uniformly distributed and uniformly sized cells. Further benefit of this nature is obtained in a second embodiment depicted in FIG. 6. The grooves in metering section 28 of plunger 12 terminate just short of the ends of metering section 28 leaving a circumferential land 64 at each end of metering section 28. The circumferential lands 64 have passages 66 connecting metering section grooves 36 with screw section 24 upstream, and with mixing section grooves 42 downstream. The flow of plasticate is indicated in FIG. 6 by arrows 68. The function of circumferential lands 64 is to close foaming agent inlet 26 at the beginning and end of each stroke of plunger 12 to avoid overconcentration of foaming agent in the plasticate at these points.

The second embodiment also provides a more tortuous path for plasticate. At a uniform location downstream in primary mixing section 40, grooves 42 and slots 46 are obstructed by first barriers 70. At another uniform location further downstream, bore 50 and slots 46 are obstructed by second barriers 72. The resulting tortuosity causes greater mixing of the plasticate.

EXAMPLE

An existing reciprocating-screw machine for injection molding of solid plastic articles was adapted to practice this invention. A plunger pursuant to the first embodiment (except that protrusions in the secondary mixing section were omitted) was installed into the plasticating-extruding barrel which had been fitted with a foaming agent inlet. The barrel had an internal diameter of about 2 inches. The plunger had a metering section length of 1.25 inches, a primary mixing section length of 3.9 inches and a combined valve section and end section length of 1.85 inches. Grooves in the metering and mixing section were 0.25 inches deep. The low lands in the mixing section provided a clearance of 0.025 inches with the barrel wall, and the high lands a clearance of 0.002 inches. The plunger rotational speed used was 100 rpm.

The resin was a thermoplastic polyester with a melt flow viscosity index of about 2 to 3. The plasticate was processed at a temperature of about 410° F. and a throughput rate of 14.3 pounds per hour.

In the molding cycle sequence, the mold gate opened for 20 seconds and closed for 90 seconds. During the gate-open interval, the plunger stroked forward ramming a plasticate charge of 7 fluid ounces into the mold. During the gate-closed interval, the mold cooled, opened, discharged the solidified article and closed. Concurrently during the gate-closed interval, the plunger moved rearward in its barrel as a new charge of plasticate accumulated ahead of it.

The foaming agent employed was nitrogen gas supplied from a high pressure cylinder initially at a pressure of about 2400 psig. The nitrogen pressure was reduced by a pressure regulator and further controlled by setting a precision metering valve which was connected to the inlet tap on the barrel. In various experiments, the pressures established downstream of the precision valve were in the range of 250 to 400 psig.

The finished polyester articles had smooth skins and foamed cores with 90 percent of the cells less than 0.04 inches in diameter. With nitrogen supplied at 400 psig, the density of the foamed articles was 0.4 grams per cubic centimeter compared with an unfoamed density of 1.2 Density reductions of from 10 to 90 percent are possible depending on the rate of nitrogen introduction.

Although the invention has been described with a certain degree of particularity, it should be understood that the present disclosure has been made only by way of example, and that numerous changes in the described details of construction and the combination and arrangement of parts may be made without departing from the spirit and scope of the invention as hereinafter claimed.

What is claimed is:

1. A cylindrical plunger for rotation and reciprocation in a plasticate extruder barrel, said plunger including a screw section for advancing plasticate into a longitudinal metering section for metering fluid foaming agent into plasticate, the length of said metering section being substantially equal to the intended length of reciprocation of said plunger, the surface of said metering section having a plurality of alternate grooves and lands, said grooves extending along the length of said metering section, and terminating before each end of said metering section thereby forming a circumferential land at each end of said metering section, said circumferential lands having passages therein severally connecting said metering section grooves with longitudinal sections of said plunger upstream and downstream of said metering section.

2. A cylindrical plunger for rotation and reciprocation in a plasticate extruder barrel, said plunger including:
   (a) a longitudinal metering section for metering fluid foaming agent into said plasticate, the length of said metering section being at least equal to the intended length of reciprocation of said plunger, the surface of said metering section having a plurality of alternate metering-section grooves and lands extending substantially the length of said metering section;
   (b) a mixing section downstream of said metering section, the surface of said mixing section having a plurality of alternate grooves and lands, said mixing-section grooves having upstream ends severally communicating with the downstream ends of said metering-section grooves;
   (c) said mixing section further having an internal bore and a plurality of radial slots, said slots severally connecting the surface of said plunger in said mixing section with said bore;
   (d) first barriers in said grooves and in said radial slots in said mixing section, said first barriers at a uniform location longitudinally downstream of the upstream ends of said mixing-section grooves; and
   (e) second barriers in said internal bore and in said radial slots in said mixing section, said second barriers at a uniform location longitudinally downstream of said first barriers.

3. An plasticate extruder comprising:
   (a) a hollow barrel;
   (b) a foaming agent inlet fixed in said barrel; and (c) a cylindrical plunger mounted for rotation and reciprocation in said barrel, said plunger having:
  (1) a longitudinal metering section contiguous to said foaming agent inlet, the length of said metering section being at least equal to the intended length of reciprocation of said plunger, the surface of said metering section having a plurality of grooves and lands extending substantially the length of said metering section so that said foaming agent inlet is alternately covered and uncovered by said metering-section lands and grooves when said piston rotates and reciprocates;
  (2) a mixing section downstream of said metering section, the surface of said mixing section having a plurality of alternate mixing-section grooves and lands, said mixing-section grooves having upstream ends severally communicating with the downstream ends of said metering-section grooves,
  (3) said mixing section further having an internal bore and a plurality of radial slots severally connecting the surface of said mixing surface with said bore;
  (4) first barriers in said grooves and in said radial slots in said mixing section, said first barriers at a uniform location longitudinally downstream of the upstream ends of said mixing-section grooves; and
  (5) second barriers in said radial slots and in said bore in said mixing section, said second barriers at a uniform location longitudinally downstream of said first barriers.

4. The plunger as in claim 1 further including a mixing section downstream of said metering section, said mixing section having in the surface thereof a plurality of alternate mixing-section grooves and lands, said mixing-section grooves having upstream ends severally communicating with the downstream ends of said metering-section grooves.

5. The plunger as in claim 4 wherein said mixing section has an internal bore and a plurality of radial slots, said slots severally connecting said internal bore with the surface of said plunger in said mixing section.

6. The plunger as in claim 5 wherein said mixing-section lands severally comprise a pair of lands, alternately high and low relative to the surface of said plunger in said mixing section, and said radial slots are severally positioned between said high and low lands.

7. The plunger as in claim 6 further including a valve section downstream of said primary mixing section, said valve section having a chamber communicating with said bore in said mixing region, a check valve element positioned in said chamber, and a passage communicating said chamber with the surface of the plunger in said valve section.

8. The plunger as in claim 7 further including an end section downstream of said valve section, said end section having a length of plunger of reduced radius.

9. The plunger as in claim 8 wherein the length of plunger of reduced radius has a protrusions with a height not exceeding the reduction in radius of said plunger in said end section.

10. The plunger as in claim 5 further including a screw section upstream of said metering section.

11. The plunger as in claim 10 further including a valve section downstream of said mixing section, said valve section having a chamber communicating with said bore in said mixing region, a check valve element positioned in said chamber, and a passage communicating said chamber with the surface of the plunger in said valve section.

12. The plunger as in claim 11 wherein said primary mixing-section lands severally comprise a pair of lands, alternately in high and low relation to the surface of said plunger in said mixing section, and said slots are severally positioned between said high and low lands.

13. An extruder comprising:
 (a) a hollow barrel
 (b) a foaming agent inlet fixed in said barrel; and
 (c) a cylindrical plunger mounted for rotation and reciprocation in said barrel;
  (1) said plunger having a screw section for advancing plasticate into a longitudinal metering section for metering fluid foaming agent into the plasticate, the length of said metering section being substantially equal to the intended length of reciprocation of said plunger;
  (2) the surface of said metering section having a plurality of alternate metering-section grooves and lands extending along the length of said metering section, said metering-section grooves terminating before each end of said metering section thereby forming a circumferential land at each end of said metering section, said circumferential lands having passages therein severally connecting said metering-section grooves with longitudinal sections of said plunger upstream and downstream of said metering section.

14. The extruder as in claim 13 wherein said plunger further includes a mixing section downstream of said metering section, said mixing section having in the surface thereof a plurality of alternate mixing-section grooves and lands, said mixing-section grooves having upstream ends severally communicating with the downstream ends of said metering-section grooves.

15. The extruder as in claim 14 wherein said mixing section has an internal bore and a plurality of radial slots, said slots severally connecting said bore with the surface of said plunger in said mixing section.

16. The extruder as in claim 15 wherein said mixing-section lands severally comprise a pair of lands, alternately in high and low relation to the surface of said plunger in said mixing section, and said slots are severally positioned between said high and low lands.

17. The extruder as in claim 15 wherein said plunger further includes a valve section downstream of said mixing section, said valve section having a chamber communicating with said bore in said mixing section, a check valve element positioned in said chamber, and a passage communicating said chamber with the surface of the plunger in said valve section.

18. The extruder as in claim 17 wherein said plunger further includes a longitudinal end section downstream of said valve section, said end section having a length of plunger of reduced radius.

19. The extruder as in claim 18 wherein the length of plunger of reduced radius has a protrusion with a length not exceeding the reduction in radius of said plunger in said end section.

* * * * *